United States Patent
Landt

(10) Patent No.: US 9,433,223 B2
(45) Date of Patent: Sep. 6, 2016

(54) SINEW REMOVAL DEVICE, PROCESSING DEVICE HAVING SUCH A SINEW REMOVAL DEVICE, AND METHOD FOR THE AUTOMATIC REMOVAL OF SINEWS AND/OR SINEW PORTIONS SITUATED ON INNER BREAST FILLETS

(71) Applicant: Nordischer Maschinenbau Rud. Baader GmbH + Co. KG, Lübeck (DE)

(72) Inventor: Andreas Landt, Lübeck (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 103 days.

(21) Appl. No.: 14/375,814

(22) PCT Filed: Dec. 3, 2012

(86) PCT No.: PCT/EP2012/074225
§ 371 (c)(1),
(2) Date: Jul. 31, 2014

(87) PCT Pub. No.: WO2013/113428
PCT Pub. Date: Aug. 8, 2013

(65) Prior Publication Data
US 2015/0105008 A1    Apr. 16, 2015

(30) Foreign Application Priority Data
Jan. 31, 2012 (EP) .................... 12153328

(51) Int. Cl.
*A22C 21/00* (2006.01)

(52) U.S. Cl.
CPC ............. *A22C 21/00* (2013.01); *A22C 21/003* (2013.01); *A22C 21/0053* (2013.01)

(58) Field of Classification Search
CPC ... A22C 21/00; A22C 21/0038; A22C 21/06
USPC ........................................................ 452/172
See application file for complete search history.

(56) References Cited

U.S. PATENT DOCUMENTS 4,873,746 A    10/1989    Scheier et al.
4,951,354 A *   8/1990    Callsen .............. A22C 21/0069
                                                         452/136

(Continued)

FOREIGN PATENT DOCUMENTS

EP    1070456 A1    1/2011

OTHER PUBLICATIONS

PCT/EP2012/074225 International Search Report and Written Opinion Date of Mailing: Aug. 8, 2013 Nordischer Maschinenbau Rud. Baader GmbH + Co. KG 7 pages.

(Continued)

*Primary Examiner* — Richard Price, Jr.
(74) *Attorney, Agent, or Firm* — Sunstone IP

(57) ABSTRACT

A sinew separating apparatus for the automatic separation of sinews and/or sinew portions present on inner breast fillets of gutted poultry bodies which have had the wings completely removed, in which both the inner breast fillet lying directly on the carcass and the outer breast fillet covering the inner breast fillet lie in their natural position, and the poultry bodies are transported, the shoulder joints forward, in transport direction T along a transport route defining the transport plane E, in which the downwardly directed breast bone is oriented in the longitudinal direction of the transport direction T and parallel to it, comprising a pair of separators for separating the sinews and/or sinew portions from the inner breast fillet, wherein the two separators are located on opposite sides of the transport route of poultry bodies to be processed, characterized in that the separators are formed as sticking knives wherein each sticking knife is designed and configured to perform at least two cutting movements in different directions of movement and the two cutting movements are superimposable is provided. Furthermore, the invention concerns a processing apparatus having such a sinew separating apparatus and a corresponding method.

16 Claims, 6 Drawing Sheets

(56) References Cited

U.S. PATENT DOCUMENTS

Figure 1:
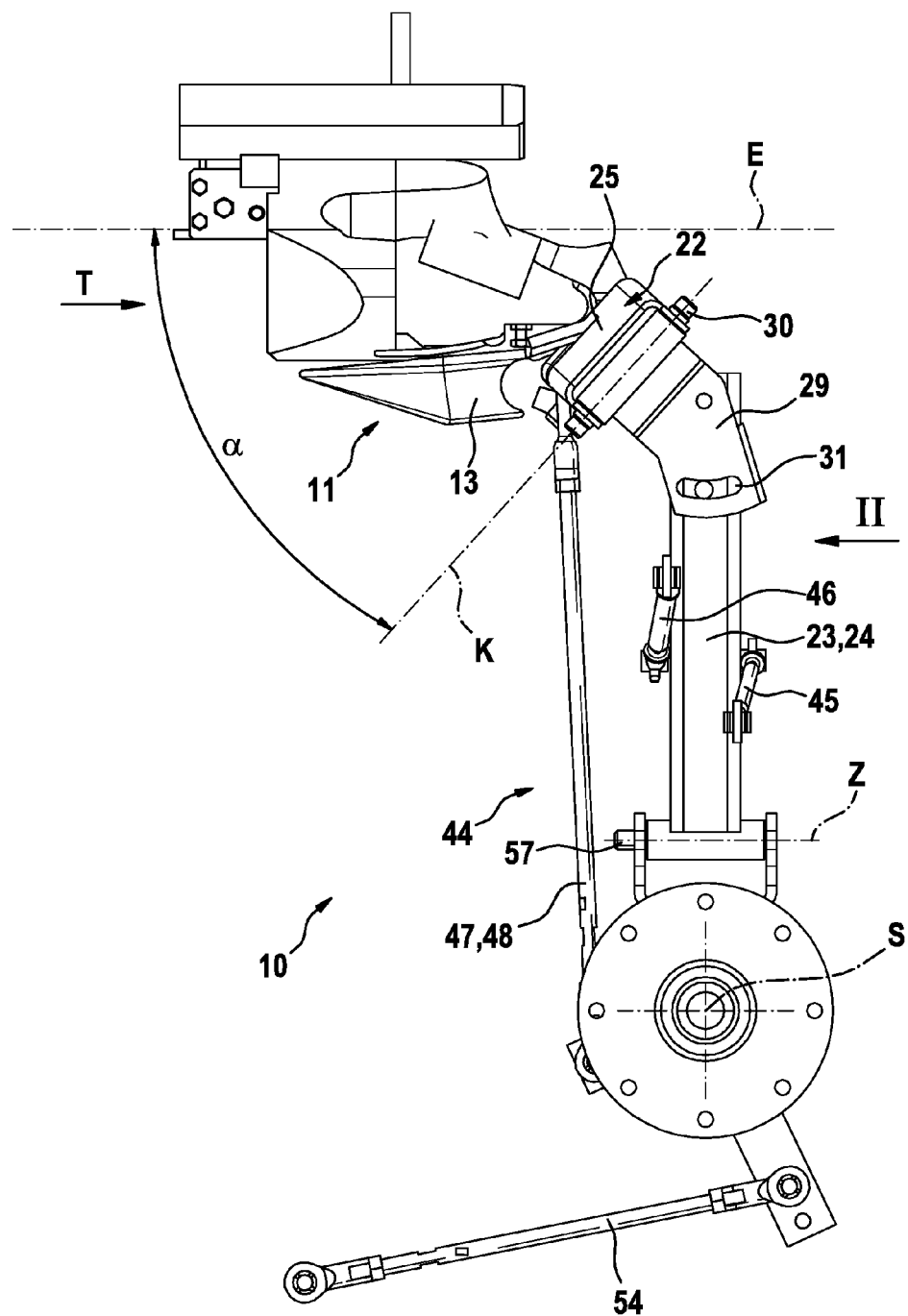

| | | | |
|---|---|---|---|
| 5,228,881 A * | 7/1993 | Sekiguchi | A22C 21/0076 452/136 |
| 5,314,374 A | 5/1994 | Koch et al. | |
| 6,736,717 B1 | 5/2004 | Annema et al. | |
| 6,935,942 B1 * | 8/2005 | Evers | A22C 21/003 452/150 |
| 7,195,554 B2 * | 3/2007 | Hayakawa | A22C 21/0076 452/135 |

OTHER PUBLICATIONS

International Preliminary Report on Patentability dated Aug. 5, 2014 from International Patent Application No. PCT/EP2012/074225 filed Dec. 3, 2012.

* cited by examiner

SINEW REMOVAL DEVICE, PROCESSING DEVICE HAVING SUCH A SINEW REMOVAL DEVICE, AND METHOD FOR THE AUTOMATIC REMOVAL OF SINEWS AND/OR SINEW PORTIONS SITUATED ON INNER BREAST FILLETS

CROSS-REFERENCE TO RELATED APPLICATIONS

This application claims priority to PCT/EP2012/074225, filed Dec. 3, 2012, which claims priority to European patent application EP 12153328.5, filed on Jan. 31, 2012, the disclosure of both are herewith incorporated by reference in their entireties.

FIELD OF TECHNOLOGY

The following relates to a sinew separating apparatus for the automatic separation of sinews and/or sinew portions present on inner breast fillets of gutted poultry bodies which have had the wings completely removed, wherein both the inner breast fillet lying directly on the carcass and the outer breast fillet covering the inner breast fillet lie in their natural position, and the poultry bodies are transported, the shoulder joints forward, in transport direction T along a transport route defining the transport plane E, wherein the downwardly directed breast hone is oriented in the longitudinal direction of the transport direction T and parallel to it, comprising a pair of separators for separating the sinews and/or sinew portions from the inner breast fillet, wherein the two separators are located on opposite sides of the transport route of poultry bodies to be processed.

BACKGROUND

The invention also concerns a processing apparatus for removing the meat from gutted poultry bodies which have had the wings completely removed, comprising processing stations arranged in a processing line, a driven conveyor with holding apparatuses arranged in series along the processing line to transport poultry bodies supported by the holding apparatuses and to guide them past the processing stations, at least one measuring apparatus emitting measurement signals for recording individual characteristics of the poultry bodies during their conveyance, and a control device, which receives the measurement signals, for controlling the operation of the processing stations, and a sinew separating apparatus as a processing station for automatic separation of sinews and/or sinew portions present on inner breast fillets.

Furthermore, the invention concerns a method for the automatic separation of sinews and/or sinew portions present on inner breast fillets of gutted poultry bodies which have had the wings completely removed, in which both the inner breast fillet lying directly on the carcass and the outer breast fillet covering the inner breast fillet lie in their natural position.

Such apparatuses or processing apparatuses and methods are typically used in handling and processing animal bodies. The apparatus mentioned hereinbefore is usually part of a processing apparatus for processing slaughtered poultry bodies, wherein animal bodies is understood to include animal body parts as well. The processing apparatus is particularly designed for handling and processing poultry (such as chicken, turkey, etc.), namely for filleting breast caps or front halves. The processing apparatus, particularly for removing the meat of gutted poultry bodies which have had the wings completely removed comprises a plurality of processing stations and tools arranged in a processing line and a driven, rotating conveyor with holding apparatuses arranged in series on it along the processing line. The transport of the animal bodies through the processing apparatus and the guiding of these past the processing stations and tools takes place with these holding apparatuses which are also referred to as transport saddles. In order to be able to control the processing stations and tools at all, a processing apparatus comprises at least the measuring apparatus emitting measuring signals for recording individual characteristics of the poultry bodies. Here the shoulder joints have proven to be particularly suitable measurement points. The information/data on the poultry body obtained from the measurements is then used by the control device for controlling the operation of the processing stations. This also applies particularly to the control of the sinew separating apparatus as part of a processing apparatus.

Here the relevant areas of the carcass of a poultry body are explained briefly with the example of a chicken for better understanding of the invention. In the area of the front half, the carcass comprises the breastbone among other things. The two coracoids connect the cranial edge of the breastbone with the shoulder joints. The coracoid bone (Os coracoideum), shoulder blade (scapula) and clavicle (clavicula) each come together in the shoulder joint. The shoulder blades are permanently connected to the corresponding coracoid at their cranial end. The two clavicles form the wishbone (furcula). The bones coming together in the shoulder joint each form a canal (canal is triosseum). The inner breast fillets lie directly on the carcass, namely in a depression or hollow formed or bordered so to speak by the coracoid and clavicle. The inner breast fillets each have a tendon which extends starting from the inner breast fillet outward to the wing from the inside through the canal formed in the shoulder joint. The outer breast fillet lies over the inner breast fillet and covers it completely.

As further processing stations or tools, a processing apparatus or line typically has at least those with which the breast fillets (main breast fillet with or without inner breast fillet) are removed completely from the carcass by cutting and/or scraping. Usually the animal bodies which are saddled on the transport saddle are transported upside down at least in the area of the apparatuses for separating the breast fillets such that the breastbone points downward. The transport of the animal bodies takes place in the area of the apparatuses referenced with the wishbone of the carcass forward. That means that the carcass is transported in the transport direction with the shoulder joints forward. When the poultry body reaches this processing station, it is gutted completely and without wings. In other words, the wings were completely separated in the previous process steps in such a way that the wings were separated in the shoulder joint, leaving the shoulder joints exposed. This also separates the tendons which connect the inner breast fillet with the wing among other things, so that sinews or sinew portions are located on the inner breast fillet, the free ends of which protrude from the inside outward through the canal formed in the shoulder joint. However, both the inner breast fillet and the outer breast fillet still lie in their original, natural position.

If one mechanically removes the outer breast fillets and the inner breast fillets from the carcass by scraping and/or cutting using said processing station, one obtains inner breast fillets along with the outer breast fillets, on which a sinew or sinew portion is located in each case. It is common practice to post-process the inner breast fillets which occur during filleting of poultry bodies in order to remove the sinewy area on the inner breast fillet. In this regard one also speaks of "clipping". This "clipping" has been performed manually up to now.

EP 1 070 456 B1 describes an apparatus and method for recovering the inner fillet, i.e. the inner breast fillet. The known apparatus envisages the sinews being separated from the inner breast fillets using circular knives. For this it is necessary to expose the inner fillets at least to the extent that the area in which the tendon attaches to the inner breast fillet is freely accessible to the circular knife. That means that the outer breast fillet must be at least partially removed. For the case that the poultry bodies are transported with their breastbone perpendicular to the conveying direction, after the outer breast fillets are at least partially drawn back, the inner breast fillets are pressed into position using a guide so that the circular knives can reach the area of the tendon attachment on the inner breast fillet. For the case that the poultry bodies are transported with their breastbone essentially parallel to the conveying direction, the inner breast fillets are first raised by a tool so that the circular knives can reach the area of the tendon attachment on the inner breast fillet.

This apparatus and the corresponding method thus have the disadvantage that the inner breast fillets must first be exposed to be able to apply the sinew cut at all. This can lead to damage of the outer breast fillet and/or the inner breast fillet. Moreover, the use of circular knives for separating the sinews or respectively sinew portions is troublesome, because the area of the tendon attachment on the inner breast fillet which is to be removed is located in a hollow between the coracoid and the clavicle. This area is difficult for the circular knives to access without damaging the bones. In order to prevent that, further preparation steps are correspondingly necessary with additional tools. This increases the cost of the apparatus and also leads to additional risks with respect to damaging the outer breast fillet and/or inner breast fillet and the carcass.

SUMMARY

An aspect relates to a simple, reliable apparatus with which the sinews or respectively sinew portions are separable quickly and safely from the inner breast fillet. It is the further object of the invention to propose a corresponding method.

This task is solved by an apparatus with the features initially mentioned, with the separators constructed as sticking knives, wherein each sticking knife is designed and configured for executing at least two cutting movements of different directions of movement, the two cutting movements being superimposable. The inventive solution enables safe, reliable separation of the sinew portion or respectively the tendon attachment present on the inner breast fillet, which remained on the inner breast fillet during the previous process steps. The invention makes it possible for the first time to sever the tendon attachments on the inner breast fillet of a poultry body in which the inner breast fillets and the outer breast fillets lie in their natural position. In other words, the separation of the sinewy area on the inner breast fillet, which constitutes the source of the sinew, is possible automatically without preparation and/or preparatory steps on the inner breast fillet and outer breast fillet. The two implemented cutting movements enable, on the one hand, the penetration of the sticking knife into the poultry body, namely below the sinew to be separated, and the withdrawal of the sticking knife, and, on the other hand, enable the execution of the severing cut by superimposing, a second cutting movement during the withdrawal of the sticking knife. The said second cutting movement leads to a pulling cut from the coracoid in the direction of the clavicle, which separates the sinew and/or the sinew portion reliably from the inner breast fillet. In other words, the overlapping of the pulling movement of the sticking knife toward the outside as a first cutting movement and the tilting movement of the sticking knife downward as a second cutting movement achieves a pulling cut with which the sinew or respectively the sinew portion is reliably separated from the inner breast fillet.

A functional development of the invention is distinguished in that each sticking knife is arranged on a carrier element pivotable on an axis of rotation K, said element in turn attached on a pivot lever pivotable on an axis of rotation Z. With this simply designed solution, the superimposed cutting movements are able to be superimposed and performed quickly with particular simplicity.

Advantageously, the axis of rotation Z is oriented parallel to the transport plane E and in the direction of the transport direction T such that the sticking knife is able to be moved transversely to the transport direction T toward and away from the poultry body, and the axis of rotation K is oriented parallel to the transport direction T and at an angle $\alpha$ with respect to the transport plane E such that the sticking knife is able to be moved upward or downward with a vertical component with respect to the transport plane E. By turning or pivoting on the axis of rotation Z, the sticking knives are able to be moved quickly and safely out of a waiting position in which the cutting knives are disengaged from the poultry body into a separating position within the poultry body, and back. By turning or pivoting on the axis of rotation K, the openly downward tilting movement of the sticking knife is performable quickly and safely.

A further preferred embodiment of the invention is characterised in that the inclination of the carrier element with respect to the pivot lever is able to be set for changing the angle $\alpha$. This ensures an adaptation of the sticking knife position to various geometries and/or poultry body sizes. In other words, an ideal cutting position of the sticking knife is settable for each geometry and/or size.

Advantageously, the sticking knives have approximately triangular cutting blades and are firmly but removably attached on the carrier element, so that the sharp cutting edge of the cutting blade is formed on the side facing away from the coracoid and points in the direction of the clavicle. On the one hand, the form of the cutting blade ensures that the sticking knife is insertable exactly in the depression formed by the coracoid and the clavicle. On the other hand, this form of the cutting blade and the alignment of the cutting edge also support the pulling cut for the clean and safe separation of the sinew or respectively sinew portion.

It has proven particularly advantageous for at least two servo motors to be assigned to the sticking knives, by which the sticking knives are able to be moved from a waiting position into a cutting position and vice versa and to perform the cutting movements. The servo motors are particularly well suited to perform movements quickly without overshoot. In particular, the servo motors are maintainable in movement and provided with the exact data for the poultry body to be processed just directly before the engagement, i.e. the separation procedure, which further improves the precision of the severing cuts.

And advantageous embodiment consists of the two pivot levers being arranged pivotably on a common carrier. On the one hand, this connection creates stability in the apparatus. On the other hand, this measure also enables the cutting movements to be synchronised particularly well.

Advantageously, the carrier is designed pivotable on an axis of rotation S, which runs parallel to the transport plane and transverse to the transport direction T, wherein the pivoting movement on the axis of rotation S and the pivoting movements about the axes of rotation Z and K are superimposable. This embodiment enables a third movement of the sticking knives. This third movement ensures the "accompanying movement" of the sticking knives with the poultry body, which is usually transported continuously through the processing apparatus. In other words, the turning or pivoting about the axis of rotation S enables the entire unit of connection carrier, the two pivot levers and the two carrier elements arranged on the pivot levers to be moved in accompaniment with the sticking knives with a horizontal component in the transport direction T in order to provide more time for the sticking knives to perform the severing cuts. The change in height for the sticking knives with respect to the transport plane E resulting from the rotation on the axis of rotation S due to movement in an arc is compensable by the other cutting movements by superimposing them.

A preferred further development envisages that the two sticking knives be operatively connected with one another via synchronisation rods. This ensures that the sinews and/or sinew portions located on the inner breast fillets on both sides of the poultry body are separable simultaneously, which increases the efficiency and performance of the apparatus.

A particularly preferred embodiment is one distinguished by a synchronisation rod, being assigned to each of the two pivot levers, said rods being able to be actuated synchronously by a servo motor, and by a synchronisation, rod being assigned to each of the two carrier elements, said rods being able to be actuated synchronously by a servo motor. This ensures optimal coordination of the two cutting movements with each other, which improves the quality of the cut.

The task is solved by a processing apparatus mentioned hereinbefore, in that said sinew separating apparatus is constructed. The resultant advantages were described in detail in conjunction with the sinew separating apparatus, for which reason reference is made to the corresponding explanations.

The task is also solved by a method with the steps mentioned hereinbefore, in that the poultry body is transported with the shoulder joints forward in the transport direction T along a transport route defining the transport plane E, with the downward pointing breastbone oriented in the longitudinal direction of the transport direction T and parallel to it, sticking knives are inserted in the poultry body above the sinews and/or sinew portions on both sides, and at least two cutting movements are performed in different directions with each of the sticking knives, wherein the two cutting movements are superimposed with each other. The resultant advantages were already explained in conjunction with the sinew separating apparatus and the processing apparatus, for which reason reference is made to the corresponding passages to avoid repetition.

Advantageously, individual characteristics of the poultry body are recorded and used to control the sticking knives. This enables the optimal insertion point to be determined for each poultry body, so the sticking knives can penetrate directly into the depression formed by the coracoid and clavicle past the outer breast fillet in the area of the shoulder joint below the sinew to be separated.

Preferably the sticking knives are each moved about at least two axes of rotation Z and K to perform the insertion and cutting movements, which ensure ideal cutting, guidance in a quick, reliable manner.

A particularly preferred step is distinguished in that the sticking knives are each inserted laterally into the poultry body up to the coracoid, so that the sticking knives lie on the coracoid with their blunt guiding edge, in order then to be moved out of the poultry body along the wishbone with their sharp cutting edge facing the clavicle in superimposed cutting movements directed obliquely downward and outward with respect to the transport plane E. A very precise severing cut is achieved with this. This particularly enables line positioning of the sticking knives to take place on the carcass itself, which further improves the precision of the severing cut.

Advantageously, the sticking knives are at least partially guided following along with the poultry body in the transport direction T during the performance of the cutting movements. This enables the separation of the sinews to be performed even with high conveying speeds of the poultry bodies.

BRIEF DESCRIPTION

Figure 2:
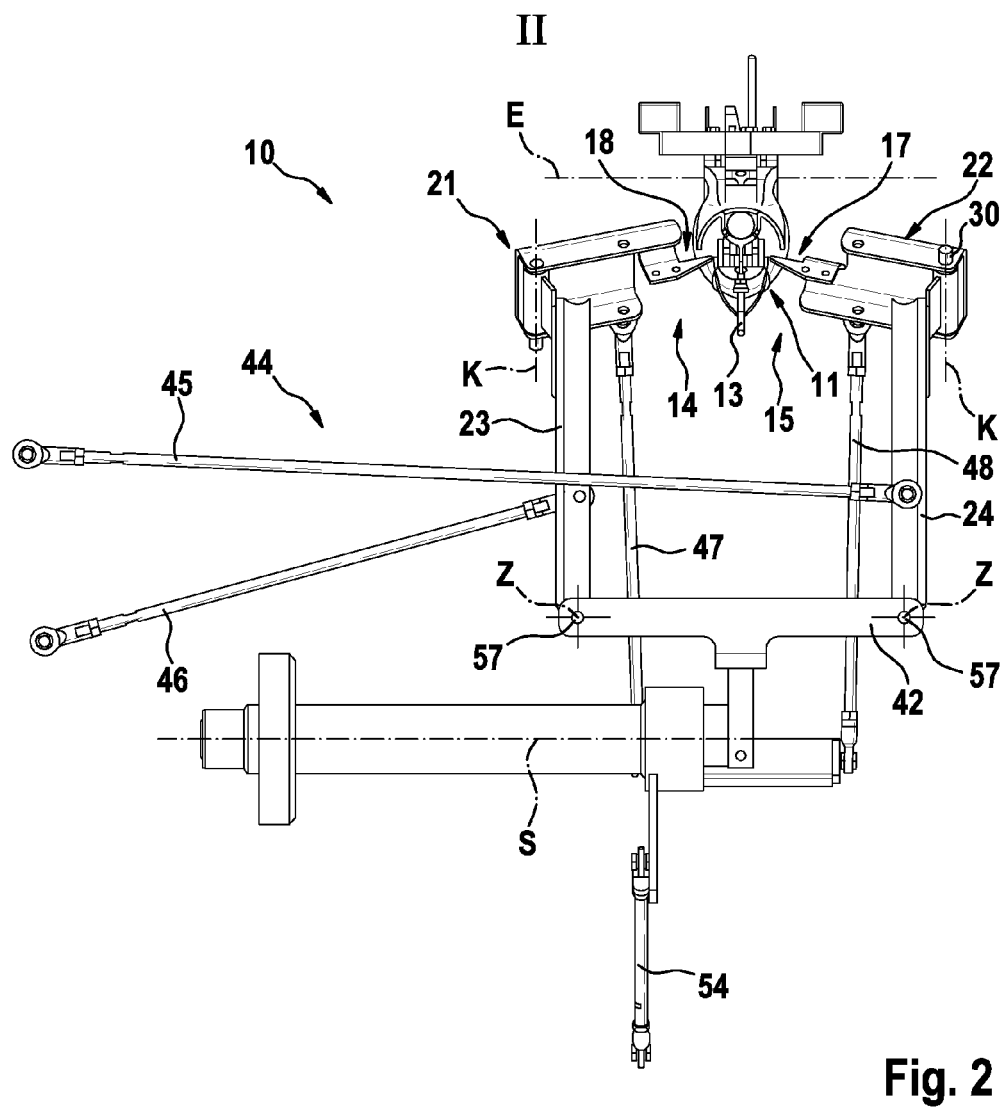
Figure 3:
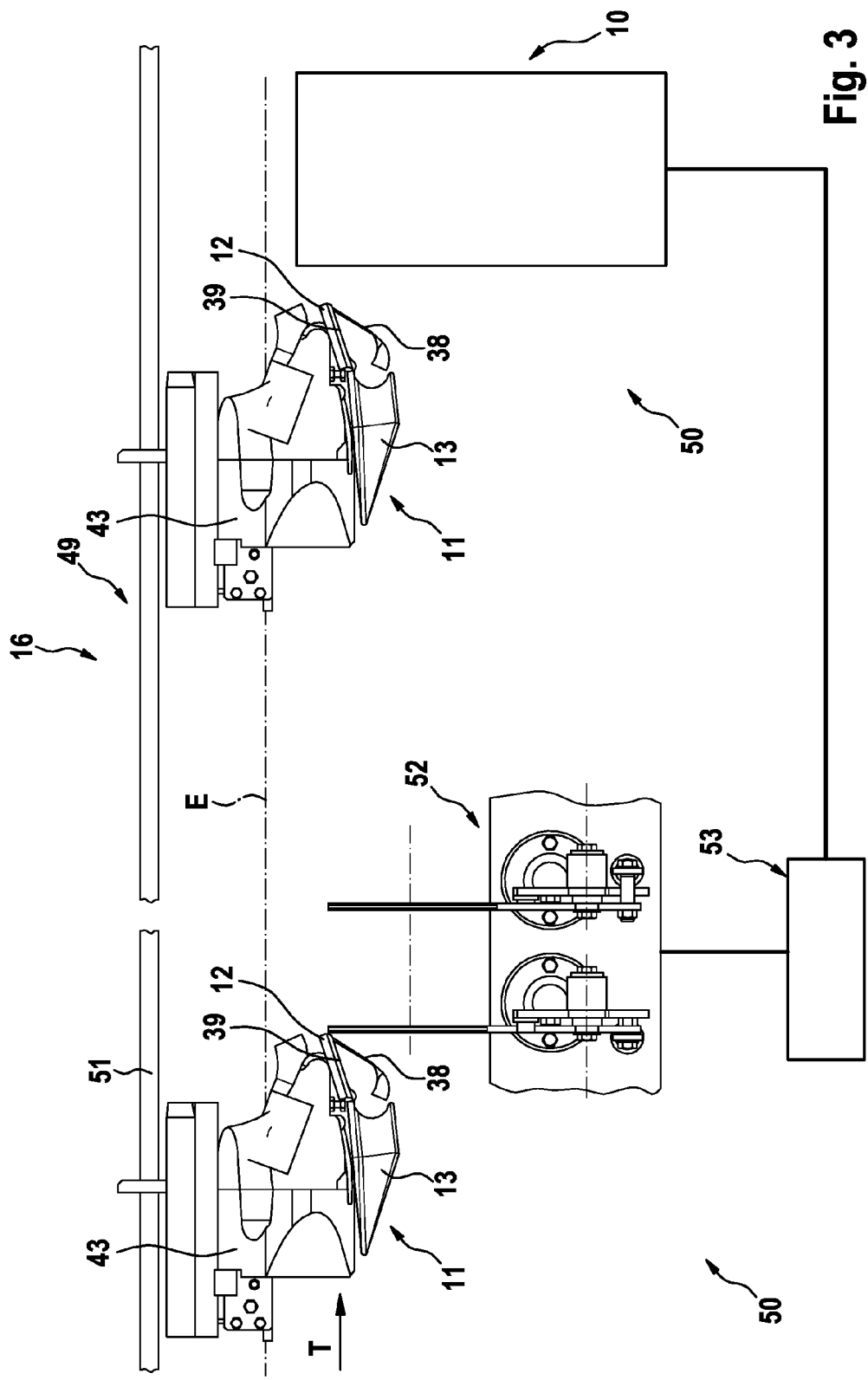
Figure 4:
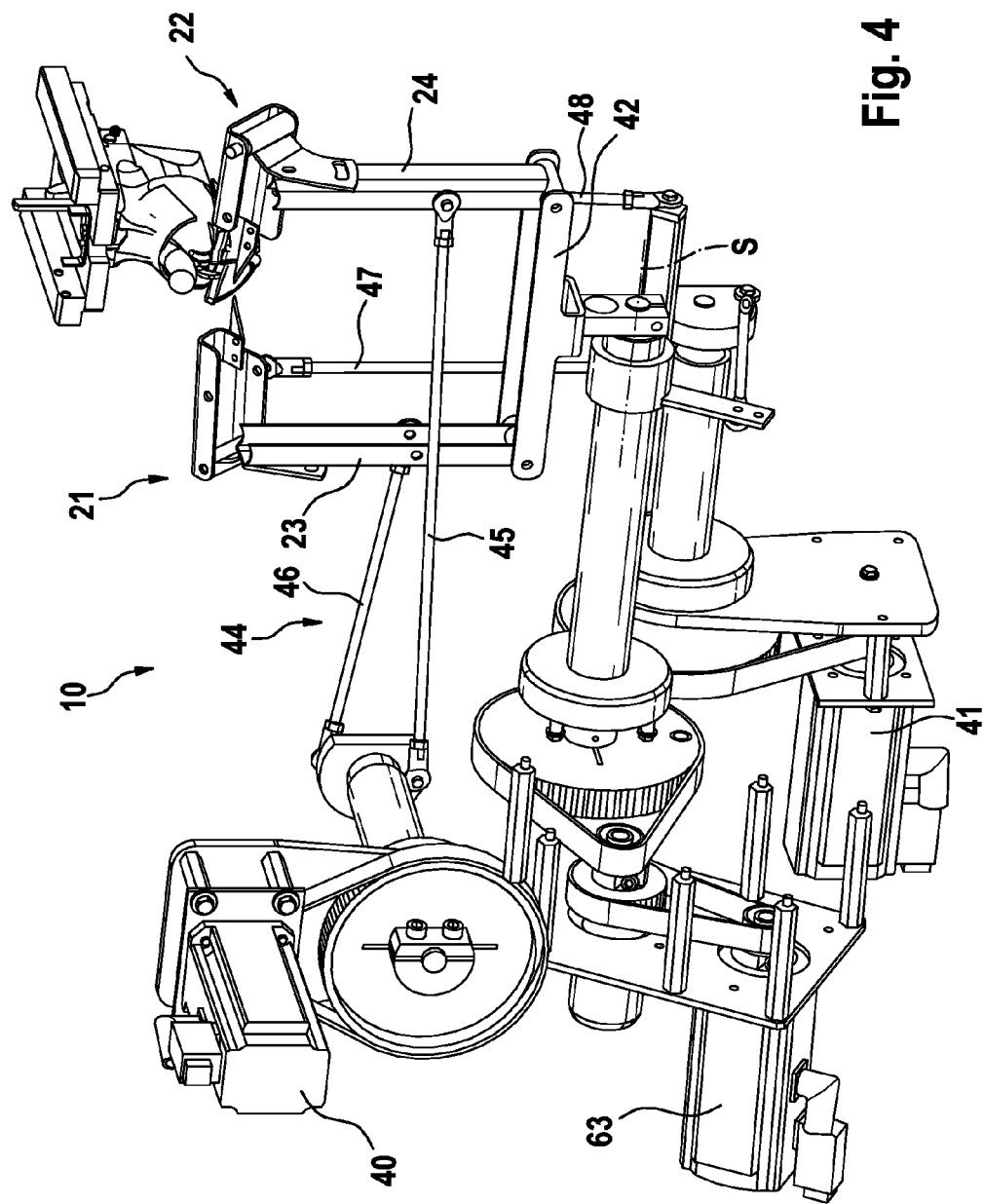
Figure 5:
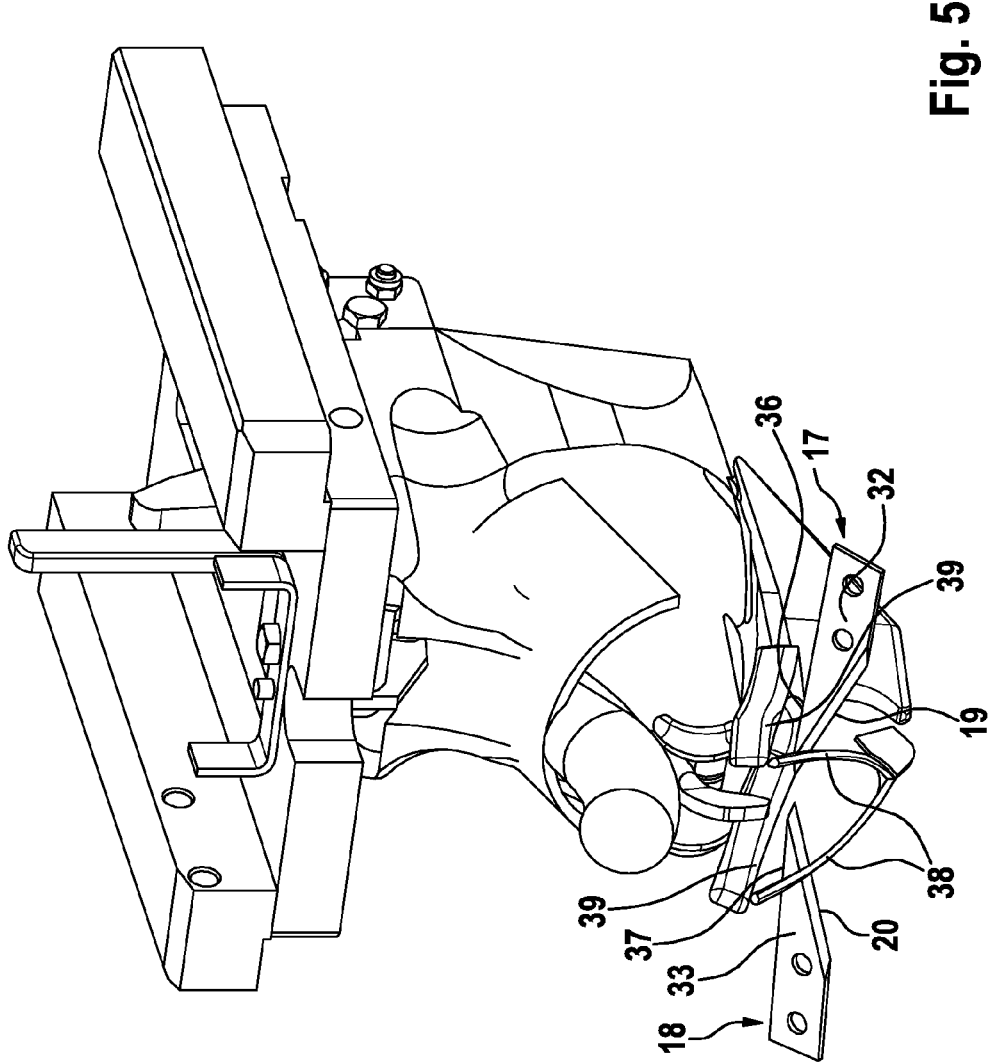
Figure 6A:
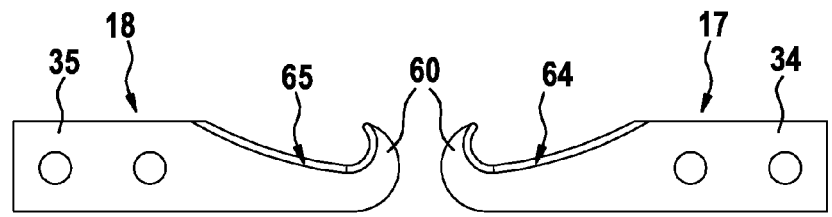
Figure 7:
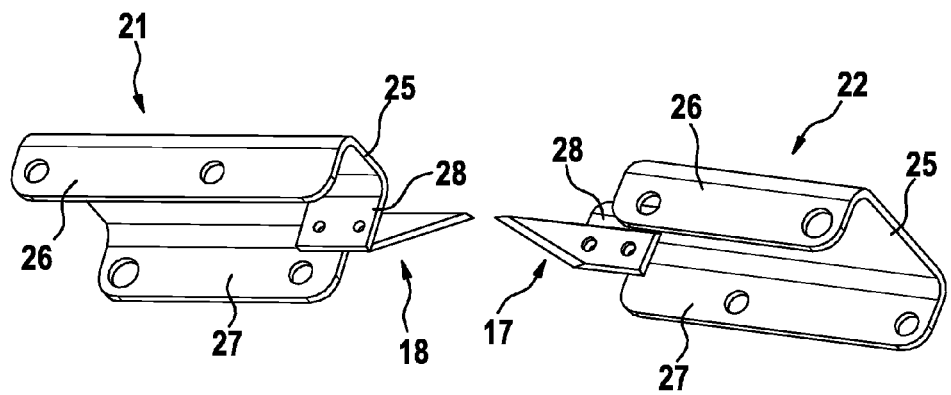

Further practical and/or advantageous features and further developments result from the dependent claims and the description. A particularly advantageous embodiment and the principle of the method are explained in detail based on the accompanying drawings. The drawings show:

FIG. 1 a schematic representation of a sinew separating apparatus,

FIG. 2 the sinew separating apparatus according to FIG. 1 in a front view corresponding to View II FIG. 1, FIG. 3 a schematic representation of a processing apparatus with a sinew separating apparatus according to the FIGS. 1 and 2, in which a holding apparatus is shown schematically with a carcass saddled on it in the processing apparatus, with the carcass shown without the breast fillets, which are still on the carcass, to provide a better overview, FIG. 4 a perspective representation of the sinew separating apparatus with drive elements, FIG. 5 a schematic representation of the sticking knives engaged with the carcass, FIGS. 6a and b further embodiments of the sticking knives, and FIG. 7 a schematic representation of the carrier elements with sticking knives.

DETAILED DESCRIPTION

The invention concerns a sinew separating apparatus for the automatic separation of sinews and/or sinew portions present on inner breast fillets of gutted poultry bodies which have had the wings completely removed, particularly during the filleting of breast caps of a chicken. Of course the sinew separating apparatus is also designed and configured for filleting breast caps/front halves of other poultry bodies. This sinew separating apparatus is envisable as a single unit, for example as a retrofit kit or replacement part in existing processing apparatuses. However, the invention also concerns such a sinew separating apparatus as part of a processing apparatus in which as plurality of processing stations is envisaged in a processing, line, of which one can be the sinew separating apparatus.

The sinew separating apparatus 10 shown in FIGS. 1 and 2 for the automatic separation of sinews and/or sinew portions present on inner breast fillets of gutted poultry bodies which have had the wings completely removed, in which both the breast fillet lying directly on the carcass 11 and the outer breast fillet covering the inner breast fillet lie in their natural position, and the poultry bodies are transported, the shoulder joints 12 forward, in transport direction T along a transport route defining the transport plane E, wherein the downwardly directed breast bone 13 is oriented in the longitudinal direction of the transport direction T and parallel to it, comprising a pair of separators 14, 15 for separating the sinews and/or sinew portions from the inner breast fillet. The two separators 14, 15 are on opposing sides of the transport route.

Such a sinew separating apparatus 10, which is usually attached to a frame, a support or a housing of a processing apparatus 16 which is described further below, is distinguished according to the invention by the separators 14, 15 being constructed as sticking knives 17, 18, wherein each sticking knife 17, 18 is designed and configured for executing at least two cutting movements of different directions of movement, the two cutting movements being superimposable. That means that the option of superimposing the cutting movements ensures an individual cutting guidance by each sticking knife 17, 18 having at least two independent axes of movement. Sticking knives 17, 18 are understood to be all separating tools which ensure selective or directed penetration into the poultry body and which have at least one cutting edge 19, 20 with which a severing cut is performable.

The features and further developments described below represent preferred embodiments of the invention in each case considered alone or in combination with one another.

In a preferred embodiment, each sticking knife 17, 18 is arranged on a carrier element 21, 22 pivotable about an axis of rotation K, said element in turn attached on a pivot lever 23, 24 pivotable about an axis of rotation Z. In the embodiment shown, the carrier element 21, 22 is a U-shaped section with a cover plate 25 and side walls 26, 27. There is a holding plate 28 for the sticking knife 17, 18 constructed on the cover plate 25. The holding plate 28 is preferably perpendicular to the cover plate 25, but can also be oriented at another angle oblique with respect to the cover plate 25. The sticking knives 17, 18 are attached to the holding plate 28. The carrier element 21, 22 is constructable in one or more pieces. Of course the carrier element 21, 22 can also be constructed in another manner, such as a frame structure, lever element, flange solution or the like.

The carrier element 21, 22 is arranged to be pivotable on a flange element 29. The flange element 29 comprises an axle bolt 30 bearing the carrier element 21, 22 with its side walls 26, 27 rotatable about the axis of rotation K. However, other solutions can also be used for pivoting the carrier element 21, 22 about the axis of rotation K, such as a shaft design, as hinge solution or the like. The carrier element 21, 22 is attached securely but detachably to the pivot lever 23, 24 via the flange clement 29. The pivot levers 23, 24 are simple sections in the embodiment shown. The carrier elements 21, 22 are attached to a free end of the pivot levers 23, 24. The pivot levers 23, 24 are supported on the opposing end and able to rotate about the axis of rotation Z. For this an axle bolt 57 which is mounted in a carrier 42 is arrangeable on the pivot lever 23, 24, for example. However, other solutions can also be used for pivoting the pivot lever 23, 24 about the axis of rotation Z, such as a shaft design, a hinge solution or the like.

The axis of rotation Z is preferably oriented parallel to the transport plane E and in the direction of the transport direction T such that the sticking knife 17, 18 is able to be moved transversely to the transport direction T toward and away from the poultry body. The term transport plane is not a two-dimensional plane in a strictly mathematical sense in the present case. Because the poultry bodies have a certain thickness, the term is only to be understood in the sense that the poultry bodies are transported in a horizontal direction parallel to a convey or of the processing apparatus 16 (see FIG. 1 or 3, for example). The movement of the sticking knives 17, 18 transverse to the transport direction T also explicitly includes, along with a sticking knife 17, 18 striking the poultry body perpendicular to the transport direction T, a striking of the sticking knives 17, 18 on the poultry body at an angle not equal to 90°, i.e. at an acute angle. The orientation of the axis of rotation Z described enables the lateral penetration of the sticking knives 17, 18 into the poultry body and the withdrawal from it. In other words, the turning or pivoting about the axis of rotation Z enables the deployment motion of the sticking knives 17, 18 from a waiting position, in which the sticking knives 17, 18 enable a transport of the poultry body through the sinew separating apparatus it 10 without collision, into a separating position, in which the sticking knives 17, 18 are located within the poultry body to perform the severing cut, and back. In other embodiments, the axis of rotation Z can also be inclined at an acute angle with respect to the transport plane E and/or the transport direction T.

The axis of rotation K is preferably oriented parallel to the transport direction T at an angle $\alpha$ with respect to the transport plane E such that the sticking knife 17, 18 is able to be moved upward or downward with a vertical component with respect to the transport plane E. This tilting or pitching movement of the sticking knife 17, 18 below the angle $\alpha$ makes a cutting movement of the sticking knives 17, 18 possible with a horizontal and a vertical component. That means that an intersection line results which cuts the transport plane E and ensures the separation of the sinews or sinew portions from the inner breast fillet. The angle $\alpha$ is greater than 0° and smaller than 90° and preferably between 30° and 50°. An angle $\alpha$ between 35° and 45° is particularly preferred. In further embodiments, the axis of rotation K can also be inclined at an acute angle with respect to the transport direction T.

The superimposition of the deployment and withdrawal movement of the sticking knives 17, 18 about the axis of rotation Z on one hand and the tilting or respectively pitching movement of the sticking knives 17, 18 about the axis of rotation K on the other cause the pulling severing cut to be achieved with which the sinews and/or sinew portions are separated from the inner breast fillets while the inner breast fillets are still in their original, natural position on the carcass 11.

The inclination of the carrier element 21, 22 with respect to the pivot lever 23, 24 is optionally sellable for changing the angle $\alpha$. The flange element 29 can have a correspondingly shaped elongated hole 31 for this, for example. This bow-shaped, curved elongated hole 31 also constitutes a stop for the setting movement at the same time. Alternatively or in addition, the holding plate 28 can also be adjustable on the carrier elements 21, 22 in their orientation with respect to the cover plate 25, for example by a plurality of indexed positions to be able to adapt the position of the sticking knives 17, 18 with respect to the poultry body.

Figure 6B:
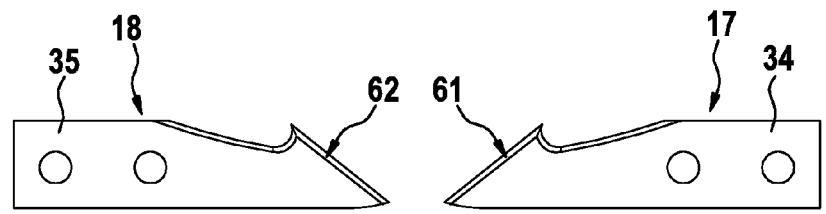

In the embodiment described, the sticking knives 17, 18 have cutting blades, 32, 33 which are preferably designed approximately triangular. Furthermore, the sticking knives 17, 18 comprise a mounting body 34, 35, which is preferably designed in one piece with the cutting blades 32, 33. The sticking knives 17, 18 are securely but detachably attached to the mounting body 34, 35 via the holding plates 28. The cutting blades 32, 33 have their sharp cutting edges 19, 20 on one side. On the side facing away from the cutting edges 19, 20, there are guiding edges 36, 37 which are constructed bluntly. The sharp cutting edges 19, 20 of the cutting blades 32, 33 point in the direction of the clavicles 38 of the carcass 11. Correspondingly, the blunt guiding edges 36, 37 of the cutting blades 32, 33 point in the direction of the coracoids 39 of the carcass 11. However, the sticking knives 17, 18 can also be designed in another way. FIGS. 6 *a+b* show other preferred embodiments of the sticking knives 17, 18. The sticking knives 17, 18 according to FIG. 6*a* have a rounded "threading region" 60. In other words, the first point of the sticking knives 17, 18 penetrating into the poultry body is designed as blunt. This protects the breast fillet during penetration into the poultry body. The cutting blades 64, 65 of the sticking knives 17, 18 are preferably designed with slight curvature. The cutting blades 61, 62 of the sticking knives 17, 18 shown in FIG. 6*b* are designed with a hook shape. This embodiment also has a first point penetrating into the poultry body which is designed with a sharp edge.

The actuation of the sticking knives 17, 18, i.e. the execution of the pivoting movements about the axes of rotation Z and K, preferably takes place via servo motors 40, 41. At least two servo motors 40, 41 are assigned to the sticking knives 17, 18, by which the sticking knives 17, 18 are able to be moved from a waiting position into a cutting or separating position and vice versa and to perform the cutting movements. Instead of the servo motors 40, 41 other suitable drives can also be used. Each sticking knife 17, 18 is controllable individually. Preferably, the two pivot levers 23, 24 are arranged on a common carrier 42. The carrier 42 is preferably designed to pivot about an axis of rotation S, which runs parallel to the transport plane E and transverse to the transport direction T, for example designed to pivot by a servo motor 63. In other words, the pivot levers 23, 24 and thus the carrier elements 21, 22 with the sticking knives 17, 18 are moveable with a movement component in the transport direction T and back so that the sticking knives 17, 18 are moveable along at least temporarily with the holding apparatus 43 carrying the poultry body. This pivoting movement about the axis of rotation S, which essentially enables a limited "accompaniment" of the sticking knives 17, 18, are superimposable with the pivoting movements about the axes of rotation Z and K so that a "fluid" or continuous separation movement of the sticking knives 17, 18 is achieved. Alternatively, the accompanying movement can also take place in a linear manner, for example by a slide or the like.

As previously mentioned, the sticking knives 17, 18 can also be controlled singly and individually. However, the sticking knives can also optionally be synchronised with one another. There is a possibility for electronic synchronisation. In the embodiment shown, the sticking knives 17, 18 are mechanically and operatively connected with one another via synchronisation rods 44. This enables the cutting movements of the sticking knives 17, 18 to be performed simultaneously. A synchronisation rod 45, 46 is assigned to each of both pivot levers 23, 24, with said arms able to be actuated synchronously by the servo motor 40. A synchronisation rod 47, 48 is likewise assigned to each of both carrier elements 21, 22, with said arms able to be actuated synchronously by the servo motor 41. Of course the synchronisation can also be implemented in another way. An optional actuating rod 54 is also provided for rotation about the axis of rotation S. It can also be connected to a servo motor or another means of actuation.

As mentioned, the invention further concerns a processing apparatus 16. FIG. 3 shows only in a schematic way such a processing apparatus 16 for removing the meat of gutted poultry bodies with their wings completely removed, said apparatus comprising processing stations 50 arranged in a processing line 49. Furthermore, the processing apparatus 16 comprises a driven conveyor 51 with holding apparatuses 43 arranged in series along the processing line 49 to transport poultry bodies supported on the holding apparatuses 43 and guide these past the processing stations 50. Furthermore, at least one measuring apparatus 52 emitting measuring signals for recording individual features of the poultry bodies during their conveyance and a control device 53 for controlling the operation of the processing stations 50 which receives the measuring signals are part of the processing apparatus 16. One of the processing stations 50 is a sinew separating apparatus 10 as described in detail above according to the invention.

The principle of the method for the processing apparatus 16, including the sinew separating apparatus 10 according to the invention, which is incorporated in the processing apparatus 16, is explained in detail below based on the figures.

The essence of the inventive method for the automatic separation of sinews and/or sinew portions present on inner breast fillets of gutted poultry bodies which have had the wings completely removed, in which both the inner breast fillet lying directly on the carcass and on the outer breast fillet covering the inner breast fillet lie in their natural position, consists of the poultry body being transported, the shoulder joints forward, in a transport direction T along a transport route defining the transport plane E, wherein the downwardly directed breast bone is oriented in the longitudinal direction of the transport direction T and parallel to it, then sticking knives on both sides are inserted into the poultry body below the sinews and/or sinew portions and then at least two cutting movements are performed in different directions of movement with each of the sticking knives, with the two cutting movements superimposed on each other. This method is preferably performed mechanically and automatically with a sinew separating apparatus 10 as described above. This previously described method is furthermore preferably embedded in a line process of a processing apparatus 16, with the following manner of function.

A poultry body (a carcass with breast fillets) saddled on the holding apparatus 43 is transported past a plurality of processing stations 50 along the transport route in the transport plane E in the transport direction T by the conveyor 51 (see FIG. 3, for example). In said figure, the breast fillets have been omitted for the sake of a better overview, particularly with respect to the carcass. Of course the breast fillets, i.e. inner breast fillets and the outer breast fillets, are still in their original, natural position on the carcass in both the area of the measuring apparatus 52 as well as the area of the sinew separating apparatus 10. Each poultry body reaches the measuring apparatus 52 with the shoulder joints 12 forward and the breastbone 13 directed downward and oriented in the longitudinal direction of the transport direction T and parallel to it. The measuring apparatus 52 is used, for example, to record individual characteristics of the poultry body, preferably by measuring the position of the shoulder joints 12 (see in particular FIG. 3). The data/information determined by the measuring apparatus 52 is received by the control device 53, processed and passed on to the downstream processing stations 50; for example, in the exemplary embodiment to the sinew separating apparatus 10 for its operation.

Upon reaching the sinew separating apparatus 10, the sticking knives 17, 18 are in there waiting position, so the poultry body can first enter the sinew separating apparatus 10 without a collision with the clavicles 38 forming the wishbone directed forward. Based on the available measurement data, the sticking knives 17, 18 are then moved by control from the waiting position to the cutting position so that the sticking knives 17, 18 are inserted into the poultry body between the coracoid 39 and clavicle 38 above the sinew located on the inner breast fillet without damaging the outer breast fillet and the inner breast fillet. Then a severing cut produced from two overlapping cutting movements is performed by the sticking knives 17, 18 being moved both obliquely downward from the coracoid 39 in the direction of the clavicle 38 and away from the poultry body outwardly, as well FIG. 5 shows the sticking knives 17, 18 in such a position between the coracoid 39 and clavicle 38, wherein the sticking knives 17, 18 are already in motion away from the coracoid 39. The resulting pulling cut separates the sinews and/or sinew portions which are located on the inner breast fillets on both sides of the poultry body while the inner breast fillets still lie in their original, natural position.

To perform the insertion and cutting movements, the sticking knives 17, 18 each move about at least two axes of rotation Z and K. The sticking knives 17, 18 are each inserted laterally into the poultry body up to the coracoid 39 by a rotation or pivoting movement about the axis of rotation Z. This is only a deployment motion of the sticking knives 17, 18 on to the poultry body or into it. The sticking knives 17, 18 then lie preferably with their blunt guiding edge 36, 37 on the coracoid 39. Now the sticking knives 17, 18 go through a pivoting movement about the axis of rotation K obliquely with reference to transport plane E, downward along the wishbone while the sticking knives 17, 18 simultaneously pivot out of the poultry body about the axis of rotation Z. The pulling severing cut of the sinews or sinew portions results from these superimposed movements.

The sticking knives 17, 18 can also optionally be guided along with the poultry body in the transport direction T at least partially during the severing cut just described. By pivoting the entire unit, consisting of pivot levers 23, 24, carrier elements 21, 22 and the sticking knives 17, 18 arranged thereon, about the axis of rotation S, a limited "accompaniment" of the sticking knives 17, 18 is achievable in the transport direction T because the pivoting movement also has a horizontal component. The changes in height resulting from the pivoting movement by the vertical component is compensable by the pivoting movements about the axes of rotation Z and K. The "accompaniment" can also occur linearly by a slide, for example.

The invention claimed is:

1. A sinew separating apparatus for the automatic separation of sinews and/or sinew portions present on inner breast fillets of gutted poultry bodies which have had the wings completely removed, wherein both the inner breast fillet lying directly on the carcass and the outer breast fillet covering the inner breast fillet lie in their natural position, and the poultry bodies are transported, the shoulder joints forward, in transport direction T along a transport route defining the transport plane E, wherein the downwardly directed breast bone is oriented in the longitudinal direction of the transport direction T and parallel to it, comprising a pair of separators for separating the sinews and/or sinew portions from the inner breast fillet, wherein the two separators are located on opposite sides of the transport route of poultry bodies to be processed, characterised in that the separators are formed as sticking knives wherein each sticking knife is designed and configured to perform at least two cutting movements in different directions of movement and the two cutting movements are superimposable.

2. The sinew separating apparatus according to claim 1, wherein each sticking knife is arranged on a carrier element pivotable about an axis of rotation K, said element in turn attached on a pivot lever pivotable about an axis of rotation Z.

3. The sinew separating apparatus according to claim 2, wherein the axis of rotation Z is oriented parallel to the transport plane E and in the direction of the transport direction T such that the sticking knife is able to be moved transversely to the transport direction T toward and away from the poultry body, and the axis of rotation K is oriented parallel to the transport direction T and at an angle α with respect to the transport plane E such that the sticking knife is moveable upward or downward with a vertical component with respect to the transport plane E.

4. The sinew separating apparatus according to claim 2, wherein the inclination of the carrier element with respect to the pivot lever is settable for changing the angle α.

5. The sinew separating apparatus according to claim 2, wherein the sticking knives have approximately triangular cutting blades and are firmly but removably attached on the carrier element, so that a sharp edge of the cutting blade is formed on the side facing away from the coracoid and points in the direction of the clavicle.

6. The sinew separating apparatus according to claim 2, characterized in that the two pivot levers are arranged pivotable on a common carrier.

7. The sinew separating apparatus according to claim 6, wherein the carrier is designed to pivot about an axis of rotation S, which runs parallel to the transport plane E and transverse to the transport direction T, wherein the pivoting movement about the axis of rotation S and the pivoting movements about the axes of rotation Z and K are superimposable.

8. The sinew separating apparatus according to claim 1, wherein at least two servo motors are assigned to the sticking knives, by which the sticking knives are moveable out of a waiting position into a cutting position and vice versa and to perform the cutting movements.

9. The sinew separating apparatus according to claim 1, wherein the two sticking knives are operatively connected to one another via synchronization rods.

10. The sinew separating apparatus according to claim 9, further comprising a first set of synchronization rods and a second set of synchronization rods, wherein a synchronization rod from the first set of synchronization rods is assigned to each of the two pivot levers, said rods from the first set of synchronization rods being able to be actuated synchronously by a first servo motor, and wherein a synchronization rod from the second set of synchronization rods being assigned to the two carrier elements, said rods from the second set of synchronization rods being able to be actuated synchronously by a second servo motor.

11. The processing apparatus for removing the meat from gutted poultry bodies which have had the wings completely removed, comprising processing stations arranged in a processing line, a driven conveyor with holding apparatuses arranged in a row along the processing line to transport poultry bodies supported by the holding apparatuses and to guide them past the processing stations, at least one measuring apparatus emitting measurement signals for recording individual characteristics of the poultry bodies during their conveyance, and a control device, which receives the measurement signals, for controlling the operation of the processing stations, and a sinew separating apparatus as a processing station for automatic separation of sinews and/or sinew portions present on inner breast fillets, characterised in that said sinew separating apparatus is constructed according to claim 1.

12. A method for the automatic separation of sinews and/or sinew portions present on inner breast fillets of gutted poultry bodies which have had the wings completely removed, in which both the inner breast fillet lying directly on the carcass and the outer breast fillet covering the inner breast fillet lie in their natural position characterized by the following steps:
- Transport of the poultry bodies with the shoulder joints forward in a transport direction T along a transport route defining the transport plane #, wherein the downwardly directed breastbone is oriented in the longitudinal direction of the transport direction T and parallel to it;
- Insertion of sticking knives into the poultry body on both sides above the sinews and/or sinew portions; and
- Performance of at least two cutting movements in different directions of movement with each of the sticking knives, wherein the two cutting movements are superimposed on one another.

13. The method according to claim 12, wherein individual characteristics of the poultry body are recorded and used to control the sticking knives.

14. The method according to claim 12, wherein to perform the insertion and cutting and movements, the sticking knives are each moved about at least two axes of rotation Z and K.

15. The method according to claim 12, wherein the sticking knives are each inserted laterally into the poultry body up to the coracoid so that the sticking knives lie on the coracoid with their blunt guiding edge, in order to then be moved out of the poultry body along the wishbone with their sharp cutting edge facing the clavicle in superimposed cutting movements directed obliquely downward and outward with respect to the transport plane E.

16. The method according to claim 12, wherein the sticking knives are at least partially guided along with the poultry body in the transport direction T during the performance of the cutting movements.

* * * * *